United States Patent
Bush et al.

(10) Patent No.: US 10,404,094 B2
(45) Date of Patent: Sep. 3, 2019

(54) SYSTEM AND METHOD FOR POWER SHARING IN A MULTIPLE UPS SYSTEM

(71) Applicant: Liebert Corporation, Columbus, OH (US)

(72) Inventors: Terry D. Bush, Westerville, OH (US); Charles F. Blair, Powell, OH (US); Gregg J. Nelson, Delaware, OH (US)

(73) Assignee: Vertiv Corporation, Columbus, OH (US)

( * ) Notice: Subject to any disclaimer, the term of this patent is extended or adjusted under 35 U.S.C. 154(b) by 460 days.

(21) Appl. No.: 15/151,167

(22) Filed: May 10, 2016

(65) Prior Publication Data

US 2016/0336796 A1 Nov. 17, 2016

Related U.S. Application Data

(60) Provisional application No. 62/160,973, filed on May 13, 2015.

(51) Int. Cl.
*H02J 9/06* (2006.01)
*H02J 3/38* (2006.01)

(52) U.S. Cl.
CPC . *H02J 9/06* (2013.01); *H02J 3/38* (2013.01)

(58) Field of Classification Search
CPC ..................................... H02J 3/38; H02J 9/06
See application file for complete search history.

(56) References Cited

U.S. PATENT DOCUMENTS

| 7,459,803 B2 | 12/2008 | Mosman | |
|---|---|---|---|
| 2008/0034256 A1* | 2/2008 | Mosman | H02J 9/06 714/43 |
| 2015/0008745 A1* | 1/2015 | Navarro | H02J 9/06 307/64 |
| 2016/0118847 A1* | 4/2016 | Colombi | H02M 1/34 307/65 |
| 2016/0294214 A1* | 10/2016 | Mosman | H02J 7/34 |

* cited by examiner

*Primary Examiner* — Jared Fureman
*Assistant Examiner* — Emmanuel Dominique
(74) *Attorney, Agent, or Firm* — Harness, Dickey & Pierce, P.L.C.

(57) ABSTRACT

The present disclosure relates to a load sharing system having a plurality of power supplies for powering a plurality of corresponding loads. Each one of the power supplies is associated with at least one of the loads. A power bus is also provided. A plurality of inductors is connected to the power bus. Each one of the inductors is further connected to at least one of the loads and to at least one of the power supplies, such that each adjacent pair of the inductors is connected in parallel relative to at least one of the loads. Each of the inductors has an inductance value sufficient so that if a fault develops on the power bus it serves to isolate the power supplies from the power bus. The inductance value further is such that if any one of the power supplies fails, the specific pair of inductors coupled in parallel to the load associated with the failed power supply allows the load to draw power over the power bus from other ones of the power supplies through the specific pair of inductors.

5 Claims, 3 Drawing Sheets

SYSTEM AND METHOD FOR POWER SHARING IN A MULTIPLE UPS SYSTEM

CROSS-REFERENCE TO RELATED APPLICATIONS

This application claims the benefit of U.S. Provisional Application No. 62/160,973, filed on May 13, 2015. The entire disclosure of the above application is incorporated herein by reference.

FIELD

The present disclosure relates to uninterruptible power supply ("UPS") systems, and more particularly to a system and method for sharing power in a static, multiple UPS system that enables a bus fault, or a fault of one of the UPSs, to be isolated, while still enabling the remaining UPSs to power the load associated with the UPS that has failed.

BACKGROUND

The statements in this section merely provide background information related to the present disclosure and may not constitute prior art.

Existing prior art UPS load sharing systems are typically designed to meet one of two important criteria, but not both. The first is that the load sharing system needs to provide an effective way to share load between UPS modules so that the failure of one UPS module does not allow any load in the system to be dropped. The second is that the load sharing system be designed so that it can provide an effective means of isolating UPS modules from each other, to thus ensure that a fault on the electrical distribution bus which the UPS modules are coupled to will not allow any load to be dropped. However, as noted above, present day load sharing systems cannot provide both of these features at the same time.

The above described limitation is illustrated in the prior art load sharing system shown in FIG. 1. In any load sharing system there must necessarily be a "common" electrical bus which provides the path for current to flow between UPS modules and their respective loads. There may also be a number of reactive impedance components connected between the UPS modules and the common bus. The reactive components allow current to flow therethrough based on an AC voltage phase difference between the UPS modules which is controlled by a well-known and understood "frequency droop" method of power load sharing between AC sources. In prior art load sharing systems, this common bus is a single electrical bus with an inductor connected between each of the UPS modules and the common bus. The inductor can accomplish two things. Firstly, in the event of a fault on the common bus, if the inductor impedance is large enough, it can provide sufficient isolation between the UPS modules so that the fault current does not cause the UPS to exceed its current limit and lose the output voltage to the load. Secondly, in the case of a failed UPS module that goes off line, if the inductor impedance is small enough, it can allow sufficient current flow from the remaining UPS modules to the failed UPS module bus to support the load. The unfortunate limitation of this system is that it cannot provide both features at the same time. If the inductor is large enough to provide the isolation required during a common bus fault, then its impedance will be too large to allow the current flow needed to support the load of a failed UPS module. In fact, there is approximately a 2 to 1 difference between the two desired inductor values. The user of this system must therefore decide which feature is more important. The only alternative with the prior art load sharing system of FIG. 1 is to severely limit the UPS load to a point where both features can eventually be obtained. But this choice comes at a great cost penalty since the UPS modules must be used far below their rated capacity.

A new load sharing system which provides both the ability to isolate the UPSs in the event of a fault on the common bus, as well as to still enable a load to be powered when a given one of the UPSs associated with the load fails, provided that the overall power capacity available from the remaining UPSs is not exceeded, would thus provide both of the above described important features in one load sharing system.

SUMMARY

This section provides a general summary of the disclosure, and is not a comprehensive disclosure of its full scope or all of its features.

In one aspect the present disclosure relates to a load sharing system comprising a plurality of power supplies for powering a plurality of corresponding loads. Each one of the plurality of power supplies is associated with at least one of the loads for powering its associated load. The system further includes a power bus. A plurality of inductors is connected to the power bus. Each one of the plurality of inductors is further connected to at least one of the loads and to at least one of the power supplies, such that each adjacent pair of the inductors is connected in parallel relative to at least one of the loads. Each of the inductors has an inductance value sufficient so that if a fault develops on the power bus, each inductor operates to isolate the power supplies from the power bus. The inductance value further is such that if any one of the power supplies fails, the specific pair of inductors coupled in parallel to the one of the loads associated with the failed power supply allows the one load to draw power over the power bus from other ones of the power supplies through the specific pair of inductors.

In another aspect the present disclosure relates to a load sharing system comprising a plurality of power supplies for powering a plurality of corresponding loads. Each one of the plurality of power supplies is associated with a given one of the loads for powering its associated load. The system further comprises a first power bus and a second power bus. A plurality of inductors is connected to the first and second power busses and to the loads. The plurality of inductors is further configured in pairs such that each pair of inductors is coupled to an associated one of the loads and to an associated one of the power supplies. Each pair of inductors forms a parallel coupled pair of inductors relative to its associated load and to its associated power supply. Each of the inductors has an inductance value such that if a fault develops on the power bus, each inductor operates to isolate the power supplies from the power bus. The inductance value further is such that if any one of the power supplies fails, the specific pair of inductors associated with the load of the failed power supply allows the load associated with the failed power supply to draw power from the power bus through the specific pair of inductors to power the load associated with the failed power supply.

In still another aspect the present disclosure relates to a method for load sharing that comprises using a plurality of power supplies to power a plurality of corresponding loads. Each one of the plurality of power supplies is associated with at least one of the loads for powering its associated load. The method further involves using a power bus. The method further involves configuring pairs of inductors in parallel relative to each load and relative to each power supply, and further such that each pair of inductors is associated with a given one of the loads and a given one of the power supplies. The method further involves configuring the pairs of inductors to be in communication with the power bus and selecting a common value of inductance for each of the inductors. The common value of inductance is selected to be sufficient so that if a fault develops on the power bus, at least one inductor of each pair of inductors operates to isolate its associated power supply from the power bus. The inductance value is further such that if any one of the power supplies fails, the one pair of inductors coupled in parallel to the one of the loads associated with the failed power supply allows the one load to draw power over the power bus from other ones of the power supplies through the one pair of inductors.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
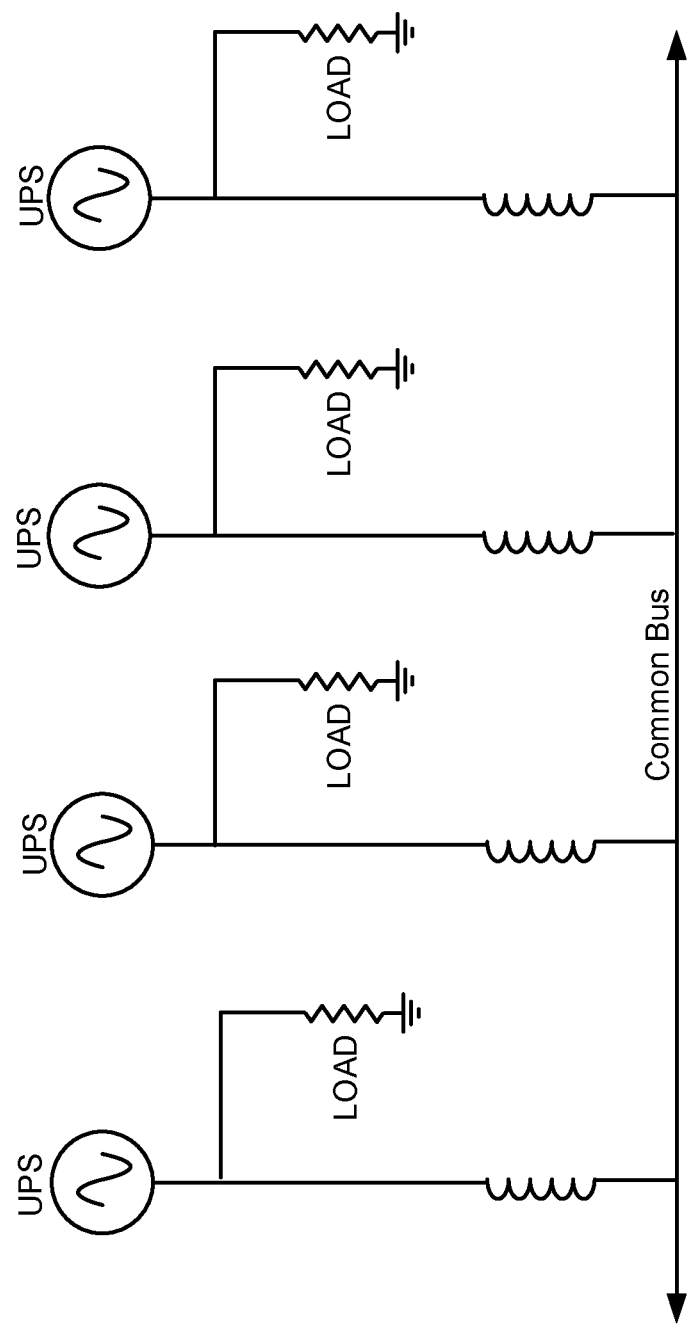
FIG. 1 is a schematic showing a prior art load sharing system where a plurality of UPSs are each supplying power to a load, with each UPS being tied to a common bus, and with an inductor positioned between each UPS and the common bus.

The following description is merely exemplary in nature and is not intended to limit the present disclosure, application, or uses. It should be understood that throughout the drawings, corresponding reference numerals indicate like or corresponding parts and features.

Figure 2:
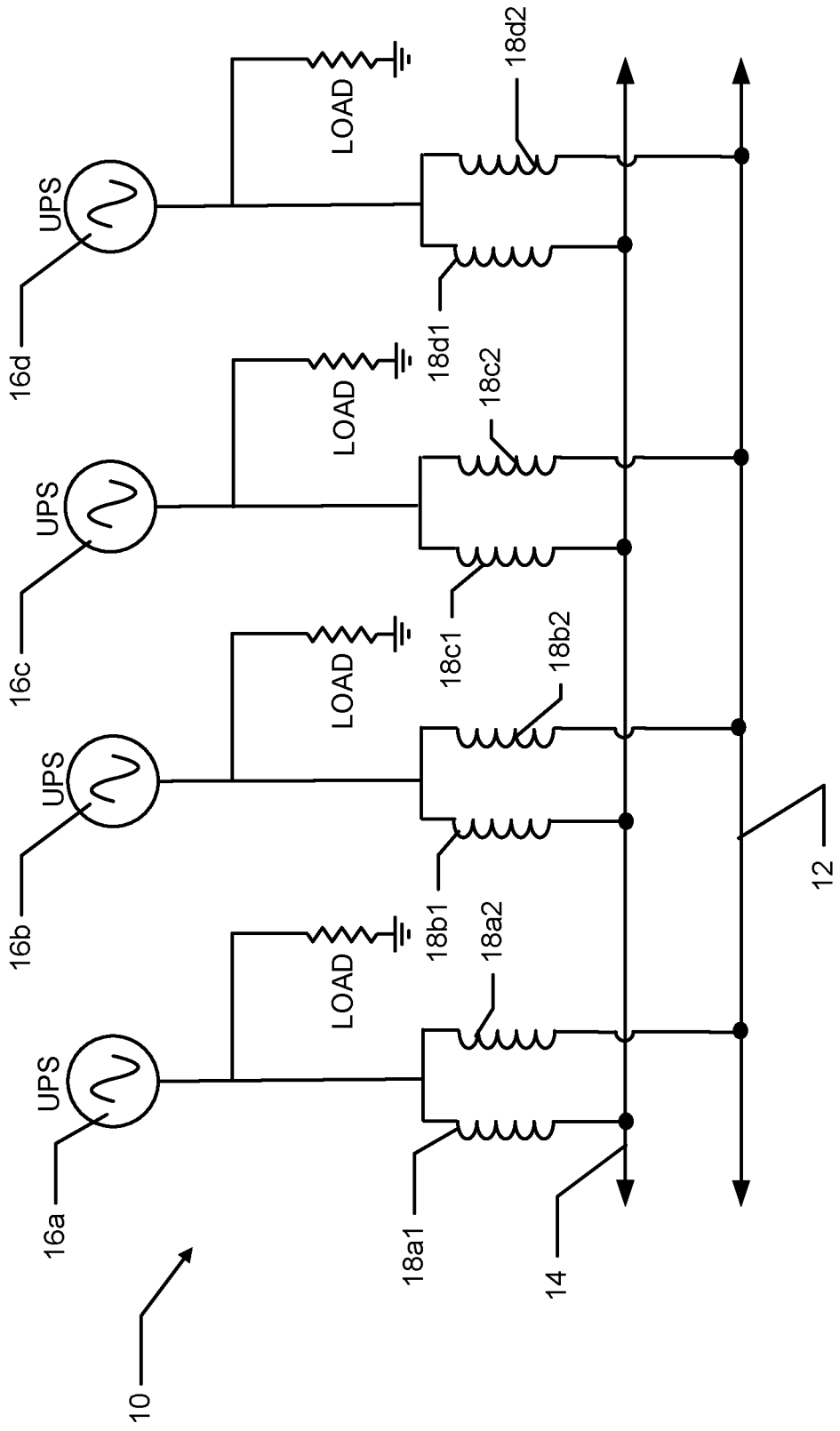
FIG. 2 is a schematic drawing of one embodiment of a load sharing system in accordance with the present disclosure, and where the system incorporates a dual bus with pairs of inductors coupled between the busses and the input side of each load.

Referring to FIG. 2, a static load sharing system 10 is shown in accordance with a first embodiment of the present disclosure. In the system 10 there are two individual common busses 12 and 14, with the UPS modules 16a-16d connected to each common bus 12 and 14 with separate pairs of inductors 18a1,18a2 through 18d1-18d2 coupled in parallel to an input side of each load. If the inductor 18a-18d value is chosen appropriately, a fault on either one of the common busses 12 or 14 will limit the fault current and avoid dropping the UPS load just as in the prior art design shown in FIG. 1. Furthermore, since the common busses 12 and 14 are fully separate and independent busses, there will not be any additional fault current flowing through the inductor 18a-18d connected to the other bus 12 or 14. However, if an individual UPS module 16a-16d fails and goes off line, current will flow from the remaining UPS modules through both of the inductors 18 associated with its load, and thus provide current to the load of the failed UPS. For example, if UPS module 16b was to fail, then current would flow from the remaining UPS modules through both busses 12 and 14 and through both inductors 18b1 and 18b2 to the load associated with UPS module 16b. Effectively, each of the inductor pairs 18a1/18a2, 18b1/18b2, 18c1/18c2 and 18d1/18d2 is configured in parallel, relative to its associated load, and the resulting pair of inductors behaves like an inductor of ½ the impedance of either of its pair of inductors (e.g., ½ the impedance of either 18b1 or 18b2 in this example). This compensates for the inherent 2 to 1 difference between the two different desired inductor values of the prior art design (FIG. 1) and allows implementation of both of the mutually exclusive "isolation" and "power sharing" features discussed in connection with the shortcomings of the prior art design shown in FIG. 1. In this example, assuming the overall capacity of the remaining UPS modules 16a, 16c and 16d is not exceeded, then the load associated with the failed UPS module 16b would remain fully powered by the remaining UPS modules 16a, 16c and 16d.

Figure 3:
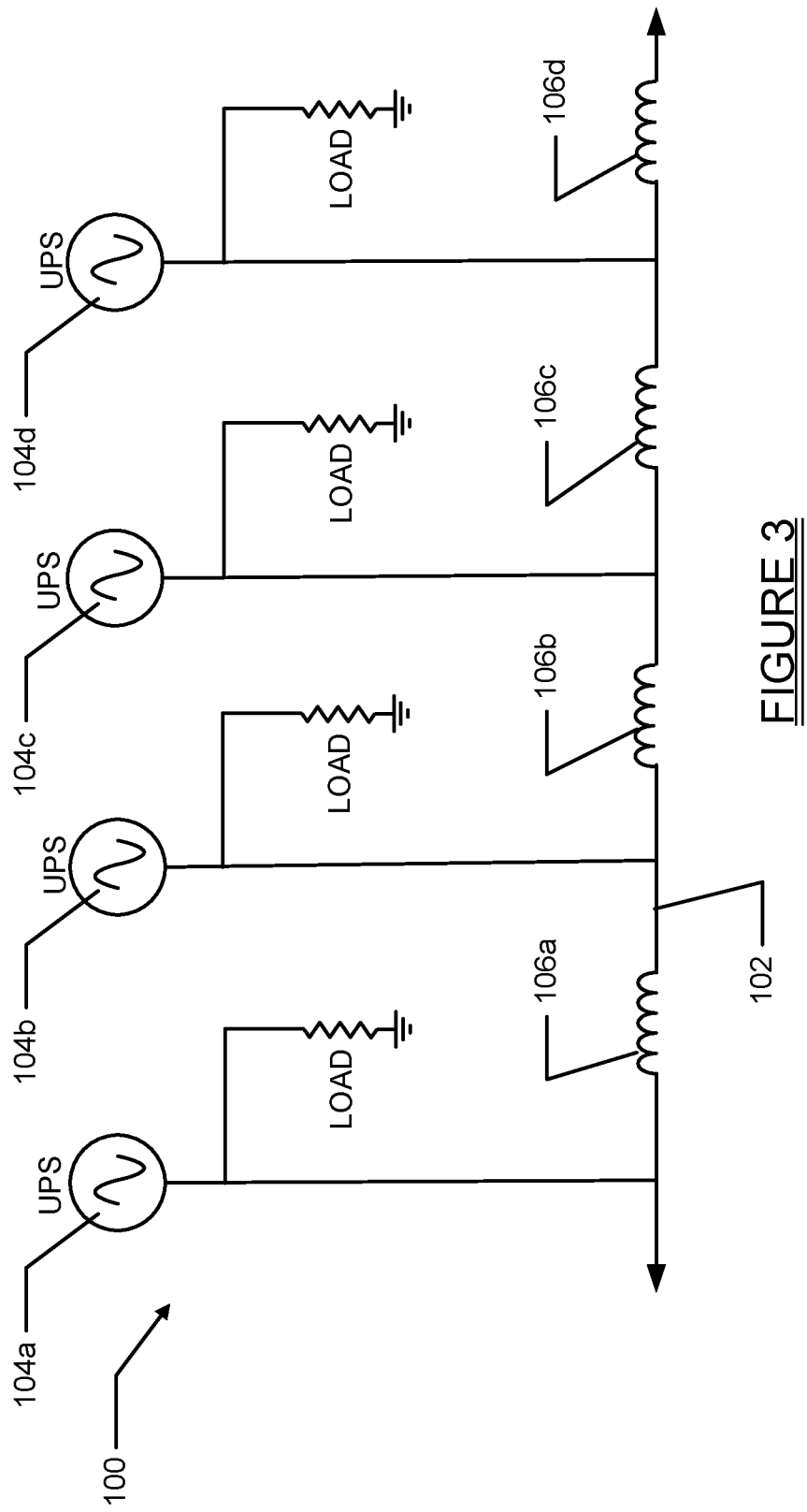
FIG. 3 is a schematic drawing of another embodiment of a load sharing system in accordance with the present disclosure in which a plurality of inductors are arranged in a "ring" configuration, to segment a single common bus into a plurality of sections.

FIG. 3 shows a static load sharing system 100 in accordance with another embodiment of the present disclosure. In the system 100 a single common bus 102 is tied to each of the UPS modules 104a-104d. Inductors 106a-106d are not connected between a given one of the UPS modules 104a-104d and the common bus 102, but rather are connected between each adjacent pair of UPS modules in a "ring" configuration. This is in contrast to the prior art design of FIG. 1, which instead has the inductors connected in a "star" configuration. Note in the system 100 that there is no common point that will present a possible fault event to all UPS modules 104a-104d of the system, as there is in the prior art design shown in FIG. 1. A fault at any one node point in the ring (i.e., along the bus 102) is still isolated from the other UPS modules 104a-104d by one of the inductors 106a-106d. And again, if the inductor value is chosen appropriately, this will effectively isolate the other UPS modules 104a-104d from the fault and avoid losing the load(s) associated with one or more other ones of the UPSs 104a-104d. Additionally, in the event of an off-line UPS module event, there are typically two ones of the inductors 106a-106d that provide a path for current to the load associated with the failed UPS. And since these two ones of the inductors 106a-106d are effectively in parallel, they exhibit only ½ the impedance of a single inductor. For example, if UPS 104b was to fail, then current would still be supplied to the load associated with UPS 104b through inductors 106a and 106b. Since these two inductors 106a and 106b are effectively in parallel (as seen by the load), they will collectively present only ½ the impedance that each would otherwise provide by itself. The impedance of the parallel coupled inductors 106a/106b is therefore sufficiently small to allow the current flow to the load associated with the failed UPS 104b. This demonstrates that the alternative "ring bus" configuration of the system 100 provides the same advantage of the "split common bus" system 10 of FIG. 2, but at an even lower cost, since only one half the number of inductors is required, and further since only one bus is required.

The common frequency droop method of power sharing may be implemented in analog or digital hardware circuitry or firmware in microprocessor or DSP based controls. The common bus configuration shown in FIGS. 2 and 3, as well as the inductor components used in these embodiments, may be implemented using standard electrical components and standard power distribution equipment.

The various embodiments of the present disclosure provide a significant advantage over prior art methods of power sharing in static, multiple UPS systems. The various embodiments can each simultaneously provide effective load sharing between multiple UPS modules, maintain all loads during loss of any one UPS module, provide isolation between UPS modules such that a fault on one UPS module does not affect proper operation of any other UPS, and provide isolation between UPS modules and the common load sharing bus so that no loads are lost during a fault on the common bus.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A load sharing system comprising:
a plurality of power supplies for powering a plurality of corresponding loads, each one of the plurality of power supplies being associated with at least one of the loads for powering its associated said load;
a power bus;
a plurality of inductors each connected to the power bus at first ends thereof, each one of the plurality of inductors further being connected at second ends to one another, and further coupled at the second ends to at least one of the loads and at least one of the power supplies, such that each adjacent pair of the inductors is connected in parallel relative to the at least one of the loads and to the at least one of the power supplies; and
each of the inductors having an inductance value sufficient so that if a fault develops on the power bus, each said inductor operates to isolate the power supplies from the power bus; and
the inductance value further being such that if any one of the power supplies fails, the specific adjacent pair of the inductors coupled in parallel to the one of the loads associated with the failed power supply allows the one load to draw power over the power bus from other ones of the power supplies through the specific adjacent pair of the inductors.

2. The load sharing system of claim 1, wherein the power bus is comprised of first and second independent power busses.

3. The load sharing system of claim 2, wherein the inductors of each said adjacent pair of the inductors are connected at the first ends thereof so that a first one of the adjacent pair is connected at the first end thereof to the first power bus, and the first end of a second one of the adjacent pair is connected to the second power bus.

4. A load sharing system comprising:
a plurality of power supplies for powering a plurality of corresponding loads, each one of the plurality of power supplies being associated with a given one of the loads for powering its associated said load;
a first power bus;
a second power bus;
a plurality of inductors connected to the first and second power busses and to the loads;
the plurality of inductors further being configured in a plurality of pairs such that each said pair of inductors is coupled at a first end thereof to one or the other of the first and second power busses such that each said pair of inductors has a first inductor of the pair coupled to the first power bus at the first end thereof, and a second inductor of the pair is coupled to the second power bus at the first end thereof,
and each said pair of inductors further being coupled to one another at second ends thereof, and at the second ends thereof in parallel to an associated one of the loads, and further in parallel at the second ends thereof to an associated one of the power supplies;
each said pair of inductors forming a parallel coupled pair of inductors relative to its associated said load and to its associated said power supply;
each of the inductors having an inductance value such that if a fault develops on the power bus, each said inductor operates to isolate the power supplies from the power bus; and
the inductance value further being such that if any one of the power supplies fails, the specific pair of inductors associated with the load of the failed power supply allows the load associated with the failed power supply to draw power from the power bus through the specific pair of inductors to power the load associated with the failed power supply.

5. A method for load sharing, comprising:
using a plurality of power supplies to power a plurality of corresponding loads, each one of the plurality of power supplies being associated with at least one of the loads for powering its associated said load;
using a power bus having first and second busses;
configuring pairs of inductors such that each said pair of inductors is in communication with a separate one of the first and second busses at first ends thereof;
configuring the pairs of inductors in parallel relative to each said load and relative to each said power supply, and further such each said pair of inductors is coupled together at second ends thereof, and
further coupled at the second ends thereof to an associated with a given one of the loads, and
further coupled at the second ends thereof to a given one of the power supplies;
selecting a common value of inductance for each of the inductors, the common value of inductance being sufficient so that if a fault develops on the power bus, at least one said inductor of each said pair of inductors operates to isolate its associated said power supply from the power bus; and
the common value of inductance further being such that if any one of the power supplies fails, the one pair of inductors coupled in parallel to the one of the loads associated with the failed power supply allows the one load to draw power over the power bus from other ones of the power supplies through the one pair of inductors.

* * * * *